Jan. 25, 1938. R. P. WILLIAMS 2,106,198
AIR METERED SHOCK ABSORBER FOR AIRPLANE LANDING GEARS
Filed Sept. 26, 1934
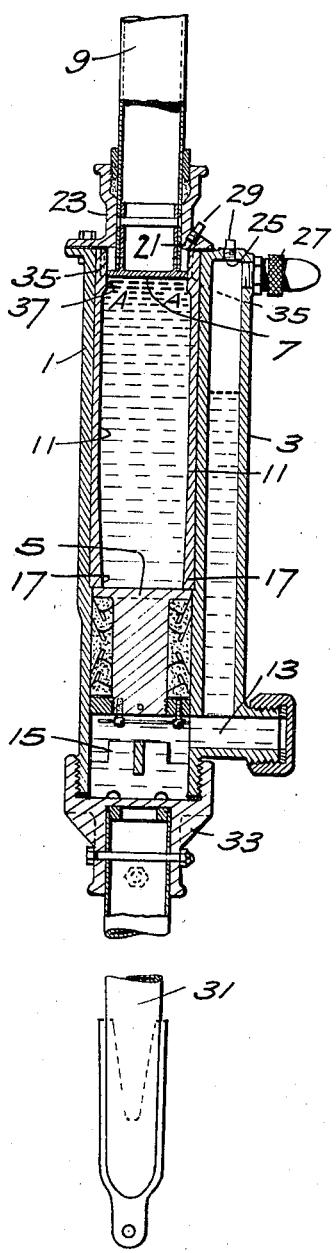
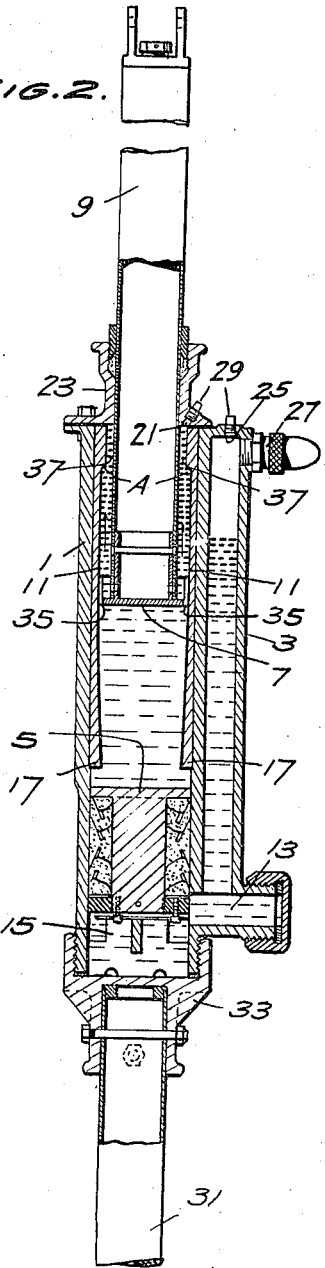
INVENTOR
RANDOLPH P. WILLIAMS
BY Francis H. Vanderwerken
and
Wade Kountz
ATTORNEYS Patented Jan. 25, 1938

2,106,198

UNITED STATES PATENT OFFICE 2,106,198

AIR METERED SHOCK ABSORBER FOR AIRPLANE LANDING GEARS

Randolph P. Williams, Hampton, Va.

Application September 26, 1934, Serial No. 745,609

10 Claims. (Cl. 267—64)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to vehicle shock-absorbing devices and more particularly to shock-absorbers of the return oleo type used with airplane landing gear to secure resiliency in landing and taxiing.

The oleo shock absorber in its simplest form consists of a cylinder, filled with a shock-absorbing medium such as oil, and a piston having a leak orifice of some kind in it through which the oil is driven when the piston is forced into the cylinder. The amount of shock absorbed depends upon the size of the leak orifice and the length of the stroke. The oleo mechanism itself affords no means for returning the piston to the extended position after the absorber has been compressed and, hence, furnishes no shock-absorbing action to take care of the small bumps in taxiing. It is customary, therefore, to employ some sort of an auxiliary device, such as rubber, steel springs, or compressed air, in conjunction with the oleo gear to furnish the proper cushion for taxiing and to return the gear to its extended position after the shock is absorbed. The chief maintenance on the return type oleo gear is due to the auxiliary taxiing device. Rubber requires frequent replacing, while compressed air requires an elaborate packing gland which gives much trouble. Steel springs are not particularly satisfactory and are quite heavy.

With the foregoing in mind, it is an object of the present invention to provide an oleo shock-absorber of such generally improved construction and design as to operate with a highly efficient dissipation of energy and without the disadvantages mentioned.

Another object of the invention is to provide an oleo shock absorber in which an elastic medium is employed, in conjunction with the shock-absorbing oil of the oleo cylinder, to carry the weight of the plane and to absorb the loads incident to landing and taxiing.

A further object is to provide a shock-absorber of the type described in which an initial pressure is controlled by air-metering and in which a controlled pressure is maintained during the compression of the device, the construction being such as to give a readily calculable operating pressure early in the oleo stroke and to maintain a maximum pressure without exceeding the allowable load factors.

Other objects and advantages of the invention will be appreciated from the following description of a specific embodiment thereof when read in connection with the accompanying drawing, wherein:

Figure 1 is a view partly in elevation and partly in section of a shock-absorber embodying the invention and shown in the fully extended position.

Figure 2 is a similar view of the shock-absorber but showing same in a partly compressed condition.

The invention, as herein disclosed, consists mainly of a large cylinder 1, a smaller cylinder or compressed air chamber 3, a free piston 5, a smaller hollow piston consisting of a piston head 7 and a hollow-piston rod 9, two ribs or oil-metering devices 11, and the necessary filling caps, packing, and plugs. The small cylinder 3 is formed integrally with the larger cylinder 1 but exteriorly of the latter in the manner shown. Both cylinders are in communication with each other through a bottom orifice 13. The large piston 5 is a floating piston and is inserted in the cylinder 1 for limited travel within the bottom portion of the cylinder, an abutment or stop 15 at the bottom of the cylinder limiting the downward travel of the floating piston and preventing same from completly covering the orifice 13. The upper limit of the piston travel is determined by the length of the two ribs 11 which extend longitudinally of the inner wall of the cylinder in advance of the floating piston and in overhanging relation with respect to the latter, as indicated at 17.

The cylinder space or chamber 19 above the floating piston is filled with a shock-absorbing medium, preferably an oil, which is introduced into the oil chamber through a filling opening 21 in the screw cap 23 at the top of the cylinder. The smaller cylinder 3 is filled partly with oil and partly with air under pressure, both being introduced into the cylinder at the upper end of the latter, the former through a filling opening 25 and the latter through an air valve 27. The filling openings are provided with suitable closure plugs 29. The smaller cylinder thus contains an elastic fluid medium and a non-compressible liquid, the latter also filling the space below the floating piston but being prevented from mingling with the oil in the oil chamber 19 by reason of the tight sliding fit of the floating piston which is so constructed as to prevent the passage of air or liquid through or around it. The pressure exerted by the elastic medium is transmitted by the liquid of the air chamber 3 and the floating piston 5 to the body of oil in the oil chamber 19, through which it is exerted against the head 7 of the hollow piston. The pressure thus exerted on the hollow piston, 7—9, at the very beginning of the stroke bears a definite relation to the air pressure in the cylinder 3. Hence, the maximum allowable load factors can be utilized almost from the start of the piston stroke, thus ensuring an efficient dissipation of energy. This initial pressure is controlled by air metering, which can be calculated by known physical laws.

The cylinders of the shock-absorber are connected with a wheel or other movable part of an airplane landing gear by means of a strut 30 fixed to and depending from a bracket 33 which is provided with an internally threaded socket into which the lower end of the cylinder is screwed. The piston head 7 of the hollow piston is secured to the lower end of the hollow piston rod 9 and is positioned at the outer or upper end of the oil chamber 19 in the fully extended condition of the shock absorber. The piston rod is adapted to be attached, at its outer end, to the airplane structure and slides in a suitable bearing in the top cap 23 of the oil chamber. When the weight of the airplane comes upon the hollow piston, 7—9, in landing, the latter is forced inwardly of the chamber 19 and in order that the initial shock of landing may be opposed by a maximum resistance without exceeding the allowable load factors, means are provided for controlling the pressure maintained during the piston stroke. This is accomplished by preventing the flow of any oil past the piston head 7 until the pressure within the device is built up to the maximum allowable load factors of the structure. This occurs in the early part of the piston stroke and is governed by the design of diametrically opposed metering ribs 11 carried by the cylinder wall and operating in grooves, ports, or leak orifices 35 arranged at the edge of the piston head 7 for coaction with the metering ribs, the construction being such as to provide for a metered flow of liquid from beneath the piston head 7, through the orifices 35, into an annular chamber 36 defined between the hollow piston and cylinder; there being openings or ports 38 in the hollow piston adjacent the piston head to permit the flow of liquid from the annular chamber into the hollow piston rod 9, as the piston and cylinder collapse.

These ribs 11 project from the wall of chamber 19 and are of varying cross sections to vary the effective flow areas of the leak orifices; the upper portions 37 of the ribs being, however, of constant cross section and engaging in and filling the piston grooves or ports 35 for a predetermined part of the piston stroke so that little or no oil passes the piston head 7 until the latter is at the point "A", at which place the cross sectional dimensions of the ribs decrease abruptly to allow the oil to pass through the ports 35. The cross sectional dimensions of the ribs increase gradually and progressively below the point "A" as the ribs approach the bottom of the oil chamber until the cross sectional dimensions at the extreme lower ends 17 are equal to the cross sectional dimensions of the upper end portions 37. Consequently, the effective flow areas of the leak orifices 35 of the hollow piston, 7—9, are gradually decreased during the lower part of the piston stroke to maintain uniformity of pressure on the hollow piston.

During flight, the shock absorber is extended with the floating piston 5 and the hollow piston, 7—9, relatively positioned as shown in Figure 1. Upon landing, the hollow piston, 7—9, moves down in cylinder 1 and since little or no oil passes the piston head 7, due to the construction of the metering ribs, the floating piston 5 also moves down, forcing oil through the orifice 13 into the cylinder 3 and increasing the air and liquid pressure by virtue of the air compression in the cushion chamber 3. Volumes and piston travel are so related as to give from the known laws of physics the desired pressure in the liquid at the moment the contours of the metering ribs change to allow liquid to flow past the piston head 7. Thereafter, during the stroke variation of the ribs, depth increases the efficiency of the device in dissipating the energy due to fall of the airplane.

The air column in the compressed air chamber provides, in addition to the above, an elastic medium for absorbing shocks when the airplane is run over the ground; the loads incident to taxiing being taken by oscillation of the piston 5 and corresponding oscillations of air pressure in cylinder 3. It thus serves the double purpose of providing an air metering device whereby the liquid pressure on the piston is controlled, and, in addition, enabling the shocks of landing and taxiing to be met and absorbed without excessive strain on the airplane structure.

This device gives a readily calculable operating pressure early in the oleo stroke and a highly efficient dissipation of energy by virtue of the controlled pressure maintained during the piston stroke. It will be noted, also, that no metallic springs, rubber, or elaborate packing glands are required in the construction of the absorber and that the design and organization of the parts is such as to give maximum accessibility.

The apparatus described is but one of many possible combinations of cylinders and pistons by which the similar results may be obtained.

Having thus described the invention, what is claimed as new is:—

1. A shock absorber having, in combination, a cylinder, an elastic medium in the cylinder, a piston movable inwardly of the cylinder for compressing the elastic medium, a mobile non-compressible liquid normally confined between the piston and the elastic medium, and means operating at a predetermined compression of the elastic medium to by-pass the liquid to the outer side of the piston during continued inward travel of the latter.

2. A shock absorber having in combination a cylinder, an elastic medium under pressure in said cylinder, a piston movable inwardly of the cylinder for compressing the elastic medium, a mobile non-compressible liquid normally confined between the piston and the elastic medium, and means operating at a predetermined compression of the elastic medium to bypass the liquid to the outer side of the piston during continued inward travel of the piston and at a rate to maintain a maximum pressure without exceeding allowable load factors.

3. A shock absorber having, in combination, a cylinder containing a volume of elastic fluent medium under pressure, a piston movable inwardly of the cylinder, a mobile volume of non-compressible liquid within the cylinder and normally confined between the piston and the elastic medium, said elastic medium being compressed by the movement of the piston and liquid inwardly of the cylinder, and means operating at a predetermined compression of the elastic medium and at a predetermined portion of the inward travel of the piston to bypass the liquid to the outer side of the piston at a rate to maintain a maximum pressure without exceeding allowable load factors, volumes and piston travel being so related as to give the desired pressure in the liquid at the moment the bypass means allows the liquid to flow to the outer side of the piston.

4. A shock absorber comprising, a cylinder containing a non-compressible liquid and an elastic medium, a floating piston between and separating the liquid and the elastic medium, a load bearing piston in said cylinder adapted when forced inwardly to move the liquid and floating piston against the elastic medium to compress the same, said load bearing piston having leak orifices, and metering devices in said cylinder normally obstructing the leak orifices at the beginning of the piston stroke and for a predetermined part of the stroke to prevent flow of liquid past the load bearing piston at such time.

5. A shock absorber comprising relatively large and small cylinders having a communicating orifice, a body of non-compressible liquid in the large cylinder, a body of non-compressible liquid and a volume of elastic fluid in the small cylinder, a floating seal between and separating the contents of the respective cylinders, a piston in the large cylinder and movable against the body of non-compressible liquid, said piston having grooves to permit passage of the said liquid past the said piston, and metering ribs projecting from the wall of the large cylinder and engaging the said grooves to vary the effective flow areas thereof, said ribs having upper portions of constant cross section engaging in and fully closing the grooves for a predetermined part of the piston stroke and then abruptly decreasing in cross section to entirely clear the grooves and subsequently varying in cross section to maintain uniformity of pressure on the piston during the remainder of its stroke.

6. A hydro-pneumatic shock absorber consisting of a cylinder; an internal metering rib on the wall of the cylinder; a hollow piston slidable in the cylinder, the head of said piston having a port at the edge thereof for coaction with said metering rib to provide for a metered flow of liquid from beneath the piston head through the said port into an annular space defined between the hollow piston and the cylinder, and the wall of said piston having a port to permit the flow of liquid from the annular chamber into the hollow piston; a floating piston interposed between the head of the hollow piston and the lower end of the cylinder; and a compressed air chamber carried by and in communication with the lower end of the cylinder.

7. In a hydro-pneumatic shock absorber, a cylinder, a floating piston therein, an air chamber on one side of said floating piston controlled as to volume by the movements of said piston, and variable liquid metering means in the shock absorber on the opposite side of said floating piston, the floating piston being arranged to be moved for compressing air at the end of the liquid metering stroke.

8. In a hydro-pneumatic shock absorber, a cylinder, a floating piston therein, an air chamber on one side of said floating piston controlled as to volume by the movements of said piston, a smaller cylinder slidable in said first named cylinder, and means for variably metering liquid by the relatively inward movements of said two cylinders, said small cylinder being adapted and arranged at the end of its compression stroke to move said floating piston to compress the air in the air chamber.

9. In a hydro-pneumatic shock absorber, a cylinder, a floating piston therein, means on one side of the floating piston for cushioning the movement of the latter, an incompressible fluent medium on the opposite side of the floating piston, a piston slidable in said cylinder for movement through said medium into and out of contact with the floating piston, and means providing for a metered flow of the medium from one side of the slidable piston to the other and functioning to progressively restrict the flow as the slidable piston approaches the floating piston.

10. In a hydro-pneumatic shock absorber, a cylinder, a floating piston therein, an air cushion on one side of the floating piston, an incompressible fluent medium on the opposite side of the floating piston, a smaller cylinder slidable in the first-mentioned cylinder for movement through the said incompressible fluent medium into and out of engagement with the floating piston, and means for variably metering the flow of the fluent medium past the smaller cylinder upon the relative inward movements of the two cylinders so that upon heavy shock there will be more tendency for the floating piston to move before the smaller cylinder engages it than there will be when the shock is of less force, thereby obtaining the assistance of the air cushion earlier in the one case than in the other.

RANDOLPH P. WILLIAMS.